(12) United States Patent
Lee et al.

(10) Patent No.: US 7,454,042 B2
(45) Date of Patent: Nov. 18, 2008

(54) APPARATUS FOR ONLINE SIGNATURE VERIFICATION USING PATTERN TRANSFORM TECHNIQUE AND METHOD THEREFOR

(75) Inventors: Jae Yeon Lee, Daejeon (KR); Yun Koo Chung, Daejeon (KR); Jung Soh, Daejeon (KR); Byung Tae Chun, Daejeon (KR); Ho Sub Yoon, Daejeon (KR); Kyu Seo Han, Daejeon (KR); Do-Hyung Kim, Busan (KR); Yongwha Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 549 days.

(21) Appl. No.: 10/532,301

(22) PCT Filed: Mar. 18, 2003

(86) PCT No.: PCT/KR03/00523

§ 371 (c)(1),
(2), (4) Date: Apr. 22, 2005

(87) PCT Pub. No.: WO2004/038532

PCT Pub. Date: May 6, 2004

(65) Prior Publication Data

US 2006/0088194 A1   Apr. 27, 2006

(30) Foreign Application Priority Data

Oct. 22, 2002   (KR) ............... 10-2002-0064519

(51) Int. Cl.
*G06K 9/46* (2006.01)

(52) U.S. Cl. ................ 382/119; 382/122

(58) Field of Classification Search ............. 382/119; 73/865.4; 178/18.01–20.04; 348/161
See application file for complete search history.

(56) References Cited

U.S. PATENT DOCUMENTS 5,111,512 A * 5/1992 Fan et al. ............... 382/122

(Continued)

FOREIGN PATENT DOCUMENTS

| EP | 0848345 | 6/1998 |
|----|---------|--------|
| KR | 100141802 | 3/1998 |
| KR | 1020020021189 | 3/2002 |

OTHER PUBLICATIONS

C. Sansone, et al.; "Signature Verification: Increasing Performance by a Multi-Stage System"; Pattern Analysis & Applications (2000) 3; pp. 169-181.

(Continued)

*Primary Examiner*—Vikkram Bali
*Assistant Examiner*—Thomas M Redding
(74) *Attorney, Agent, or Firm*—Lowe Hauptman Ham & Berner, LLP

(57) ABSTRACT

In an apparatus for online signature verification, a signature data input unit digitalizes a locus of a user signature and reads the locus as a sequence of points. A first and a second pattern transform unit performs a speed equalization and a velocity transform on the signature sequence and generates a first and a second transformed pattern sequence, respectively. A characteristics extraction unit extracts three characteristics vectors from the signature sequence, the first and the second transformed pattern sequence, respectively, to thereby generate the three characteristics vectors. A difference vector estimation unit generates a difference vector. A determination unit determines whether an input signature and the reference signature are signed by a single person.

16 Claims, 5 Drawing Sheets

U.S. PATENT DOCUMENTS 5,680,470 A * 10/1997 Moussa et al. .............. 382/119
5,730,468 A 3/1998 Wirtz
6,430,308 B1 8/2002 Ogawa et al.

OTHER PUBLICATIONS

E.A. Fadhel, et al.; "Application of a Steerable Wavelet Transform using Neural Network for Signature Verification"; Pattern Analysis & Appliacations (1999) 2; pp. 184-195.

Hangai et al.; "Writer Verification using Altitude and Direction of Pen Movement"; IEEE; 2000; pp. 479-482.

Wu et al.; "On-line signature verification based on split-and-merge matching mechanism"; Pattern Recognition Letters; 1997; pp. 665-673.

International Search Report of PCT/KR 2003/000523.

* cited by examiner

APPARATUS FOR ONLINE SIGNATURE VERIFICATION USING PATTERN TRANSFORM TECHNIQUE AND METHOD THEREFOR

CROSS REFERENCE TO RELATED APPLICATION

This application is the National Phase application of International Application No. PCT/KR2003/000523, filed Mar. 18, 2003, which designates the United States and was published in English. This application, in its entirety, is incorporated herein by reference.

FIELD OF THE INVENTION

The present invention relates to a user verification technique based on biological characteristics; and, more particularly, to an apparatus for online signature verification using a pattern transform technique and a method therefor, which is suitable for visualizing dynamic characteristics of an online signature pattern such as a signature inputted by a tablet digitizer and improving a performance of analyzing on the dynamic characteristics of a signing process by using the visualized pattern.

BACKGROUND OF THE INVENTION

An identification of a person has required checking information, e.g., a password, and identification tools such as a key and a card. However, there is a drawback in that a user may forget the password or the identification tools may be lost or stolen. To that end, a great deal of research has been devoted to development of a biometric verification method for identifying a person based on his unique biometric characteristics.

Especially, a signature verification method is a representative example using behavioral biometric characteristics detected from a personal signature. The method is considered to have a lower accuracy in comparison with a method using other biometric characteristics, e.g., fingerprints. However, the method is culturally and socially acceptable and users may easily adapt themselves thereto, so that it is regarded as a useful method.

Since a signature is a pattern based on each person's name, every signature is different in its pattern, and therefore, one can be easily distinguished from another. However, in case similar patterns are intentionally generated (these patterns are called skilled forgery), the patterns are hardly distinguishable. Accordingly, it is required to distinguish the skilled forgery from a genuine signature.

When a signature is forged, a forger makes an effort to imitate an original pattern. Thus, it takes much longer to sign or a signing becomes slower at a certain point. These dynamic characteristics of a signing process are hardly forgeable and therefore are considered to be important information for distinguishing the skilled forgery from the original pattern.

Signature information captured by using a tablet digitizer includes information on a signature pattern and the dynamic characteristics of the signing process. However, information on the dynamic characteristics are not reflected to a completed signature pattern but available only in the form of additional information, so that the information thereon are hardly recognized by a pattern analysis method used for general signature recognition.

In order to solve such problem, the dynamic characteristics have been conventionally represented as simplified parameters such as a total signing time, an average velocity and an average acceleration.

However, a conventional method using the dynamic characteristics represented as the simplified parameters has disadvantages in that a considerable amount of information may be lost, which in turn causes deterioration of a distinction between signatures, i.e., genuine vs. forgery. As a result, a more efficient method for analyzing dynamic characteristics is required.

SUMMARY OF THE INVENTION

It is, therefore, an object of the present invention to provide an apparatus for online signature verification using a pattern transform technique and a method therefor, which securely verifies an identity of a signer and improves a distinction between a skilled forgery and an original signature by analyzing characteristics of a transformed pattern, i.e., visualized dynamic characteristics of a signature pattern through a speed equalization and a velocity transform technique.

In accordance with one aspect of the invention, there is provided an apparatus for online signature verification analyzing a reference signature database (DB) of a specific user, the apparatus including: a signature data input unit for capturing a locus of a user signature and reading the digitized locus as a sequence of points sampled at regular time intervals; a first pattern transform unit for performing a speed equalization on the signature sequence read by the signature data input unit and generating a first transformed pattern sequence; a second pattern transform unit for performing a velocity transform on the signature sequence read by the signature data input unit and generating a second transformed pattern sequence; a feature extraction unit for extracting three feature vectors from, the signature sequence read by the signature data input unit, the first pattern sequence transformed by the first pattern transform unit and the second pattern sequence transformed by the second pattern transform unit, respectively, to thereby generate the three feature vectors having different information; a difference vector estimation unit for generating a difference vector between the feature vector of the specific user's reference signature read from the reference DB and the feature vector extracted by the feature extraction unit; and a determination unit for determining whether an input signature and the reference signature are signed by a single person, based on the difference vector generated from the difference vector estimation unit.

In accordance with another aspect of the invention, there is provided a method for online signature verification analyzing a reference signature DB of a specific user, the method including the steps of: (a) capturing a locus of a user signature and reading the digitized locus as a sequence of points sampled at regular time intervals; (b) performing a speed equalization on the signature sequence read in the step (a) to generate a first transformed pattern sequence; (c) performing a velocity transform on the signature sequence read in the step (a) to generate a second transformed pattern sequence; (d) extracting three feature vectors from the signature sequence read in the step (a), the first pattern sequence transformed in the step (b) and the second pattern sequence transformed in the step (c), respectively, to thereby generate three feature vectors having different information; (e) generating a difference vector between the feature vector of the specific user's reference signature read from the reference signature DB and the feature vector extracted in the step (d); and (f) determining whether an input signature and the reference signature are signed by a single person, based on the difference vector generated in the step (e).

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
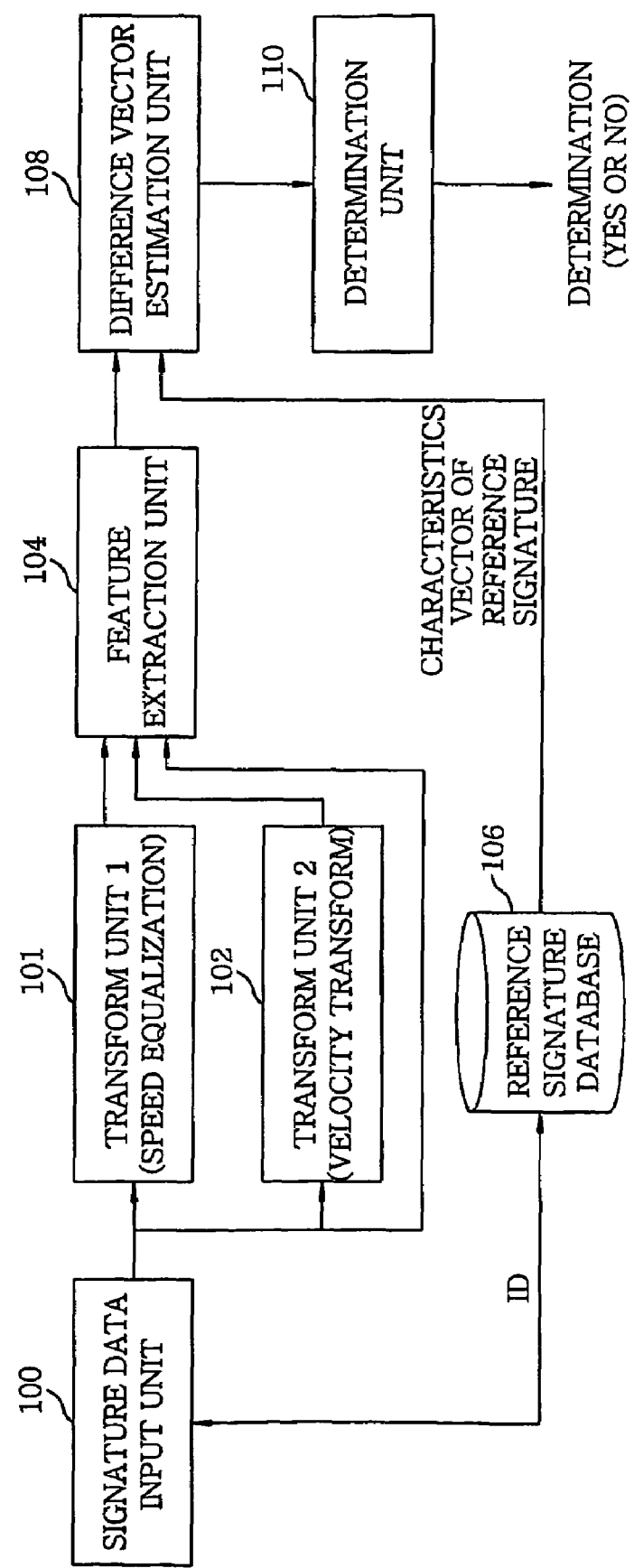
FIG. 1 shows a block diagram for illustrating an apparatus for online signature verification using a pattern transform technique in accordance with a preferred embodiment of the present invention.

FIG. 1 shows a block diagram for illustrating an apparatus for online signature verification using a pattern transform technique in accordance with a preferred embodiment of the present invention, wherein the apparatus includes a signature data input unit 100, transform units 101 and 102, a feature extraction unit 104, a reference signature database 106, a difference vector estimation unit 108 and a determination unit 110.

As illustrated in FIG. 1, the signature data input unit 100 digitizes a locus of a user signature and the digitalized locus of the user signature is read as a sequence of points sampled at regular time intervals.

The signature sequence C read by the signature data input unit 100 is represented as a two-dimensional vector list $C=\{p_1, p_2, \ldots, p_N\}$, and each of the points is sampled at the regular time intervals, wherein a property of each point $p_i$, i.e., x-coordinate and y-coordinate are indicated as $p_i(x)$ and $p_i(y)$, respectively.

The transform unit 101 and 102 respectively perform a speed equalization and a velocity transform in accordance with the present invention on the signature sequence C read by the signature data input unit 100 to generate respective transformed patterns.

A first transform unit 101 is a speed equalization transform unit for recomposing a signature pattern on the assumption that linear velocities on the locus of the signature pattern are regular. After a transform is performed, a length of a section where a signer quickly signs becomes shorter, while a length of a section where the signer slowly signed becomes longer in comparison with other sections.

The transformed results affect a pattern by visualizing dynamic characteristics of a signing process and become a basis for analyzing the dynamic characteristics.

Specifically, an input signature pattern $C=\{p_1, p_2, \ldots, p_N\}$ is transformed into another two-dimensional vector list $S=\{s_1, s_2, \ldots, s_N\}$.

The first horizontal and vertical derivative $v_x$ and $v_y$ on each point $p_i$ of the locus are obtained as follows:

$$v_x = (-p_{i+2}(x) + 8 \cdot p_{i+1}(x) - 8 \cdot p_{i-1}(x) + p_{i-2}(x))/12$$

$$v_y = (-p_{i+2}(y) + 8 \cdot p_{i+1}(y) - 8 \cdot p_{i-1}(y) + p_{i-2}(y))/12 \quad \text{Eq. (1)}$$

Based on a result of Eq. (1), a direction of the locus on the point $p_i$ is searched as follows:

$$\theta = \arctan\left(\frac{v_y}{v_x}\right) \quad \text{Eq. (2)}$$

An element $s_i$ of the two-dimensional vector list S, which is transformed by using Eq. (1) and Eq. (2), is calculated as follows:

$$s_i = p_i \; i=1, 2$$

$$s_i = s_{i-1} + (p_i - p_{i-1}) \; i=N-1, N$$

$$s_i = s_{i-1} + v\Delta t \cdot \Theta \; \text{otherwise} \quad \text{Eq. (3)}$$

In Eq. (3), v is a constant designating the velocity and $\Delta t$ is a constant designating the time interval between sampling points, which means sampling is performed at regular intervals.

Meanwhile, $\Theta$ represents a unit vector in the direction of $\theta$, i.e., the locus direction on the point $p_i$ obtained by Eq. (2). A locus of a transformed pattern has the same direction as that of an original pattern. However, since the velocity is a constant, a length of the locus becomes in proportion to a time taken to draw the locus. Therefore, the transformed pattern becomes significantly different from the original pattern.

Figure 2A:
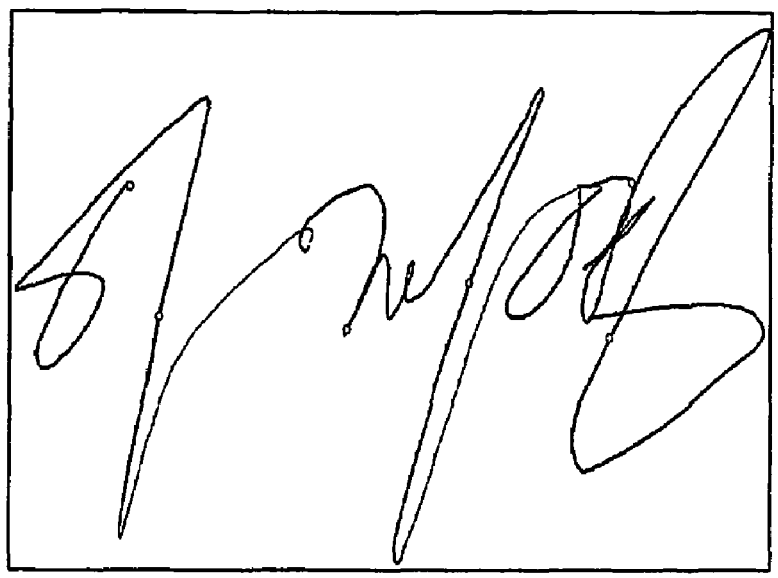
FIGS. 2A and 2B illustrate an example of a signature pattern and its speed-equalized pattern in accordance with the present invention, respectively.
Figure 2B:
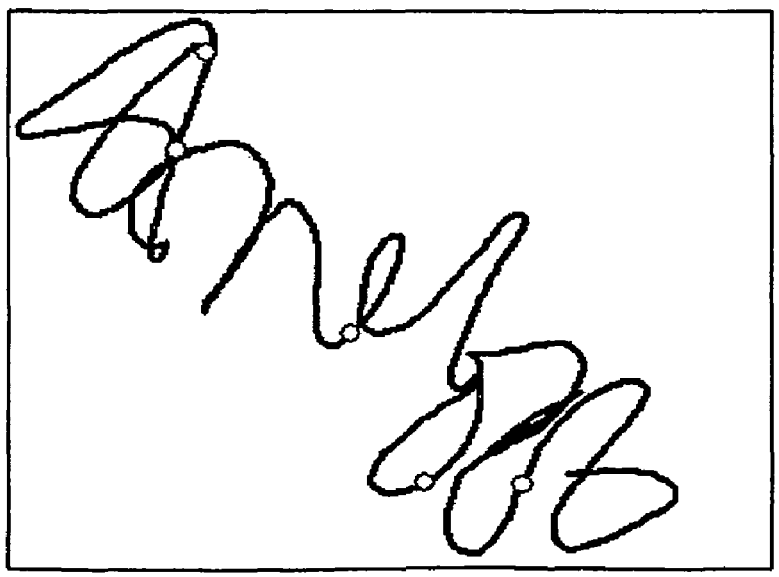

FIGS. 2A and 2B illustrate drawings for comparing an original pattern with a speed-equalized pattern.

Figure 3A:
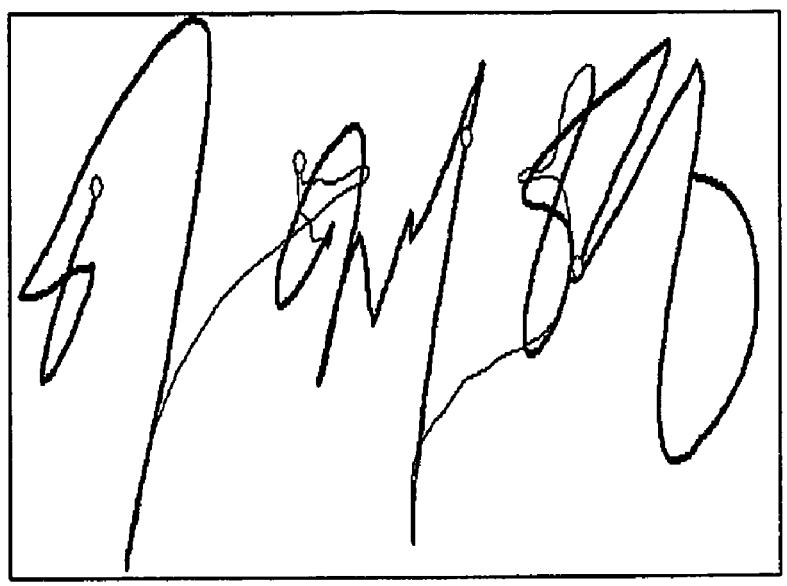
FIGS. 3A and 3B describe an example of a skilled forgery and its speed-equalized pattern in accordance with the present invention, respectively.
Figure 3B:
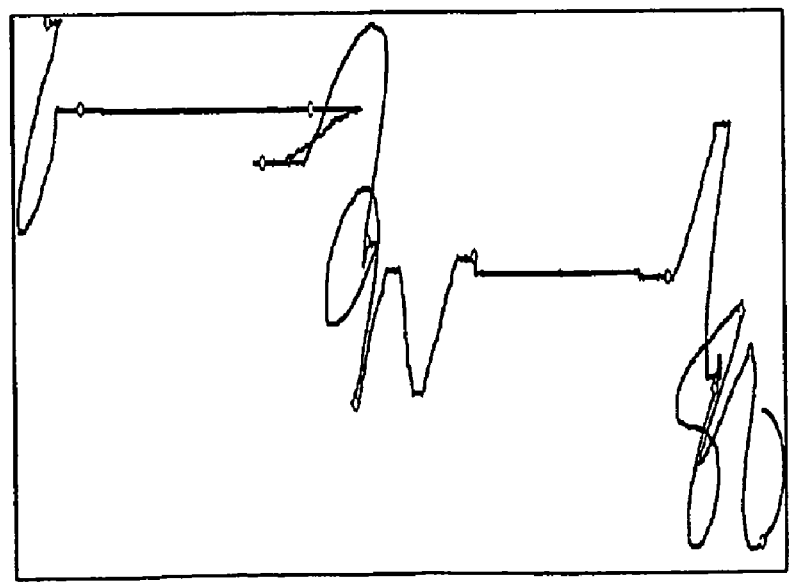

Referring to FIGS. 3A and 3B, there are illustrated a skilled forgery of a signature shown in FIG. 2A and a speed-equalized pattern thereof.

As can be seen from FIGS. 2A and 3A, the patterns in FIGS. 2A and 3A are quite similar. On the other hand, the transformed patterns in FIGS. 2B and 3B are significantly different. In other words, an original signature and a skilled forgery have similar patterns, but dynamic characteristics thereof are significantly different. Thus, the skilled forgery can be effectively distinguished from the original signature by making a comparison in transformed domain.

A second transform unit 102 of FIG. 1 is a velocity transform device for transforming a spatial pattern into a velocity domain. Specifically, an input signature pattern $C=\{p_1, p_2, \ldots, p_N\}$, is transformed into another two-dimensional vector list $V=\{v_1, v_2, \ldots, v_N\}$ by using Eq. (4) as follows:

$$v_i = v_3 \; i=1, 2$$

$$v_i = v_{N-2} \; i=N-1, N$$

$$v_i = (v_{xi}, v_{yi}) \; \text{otherwise} \quad \text{Eq. (4)}$$

The value of $v_3$ is assigned to $v_1$ and $v_2$, and the value of $v_{N-2}$ is assigned to $v_{N-1}$ and $V_N$. Values of the rest of points are determined by calculating $v_{xi}$ and $v_{yi}$. The $v_{xi}$ and $v_{yi}$ in Eq. (4) represent the first horizontal and vertical derivative on the point $p_i$, respectively, which are obtained by using Eq. (1).

Figure 4A:
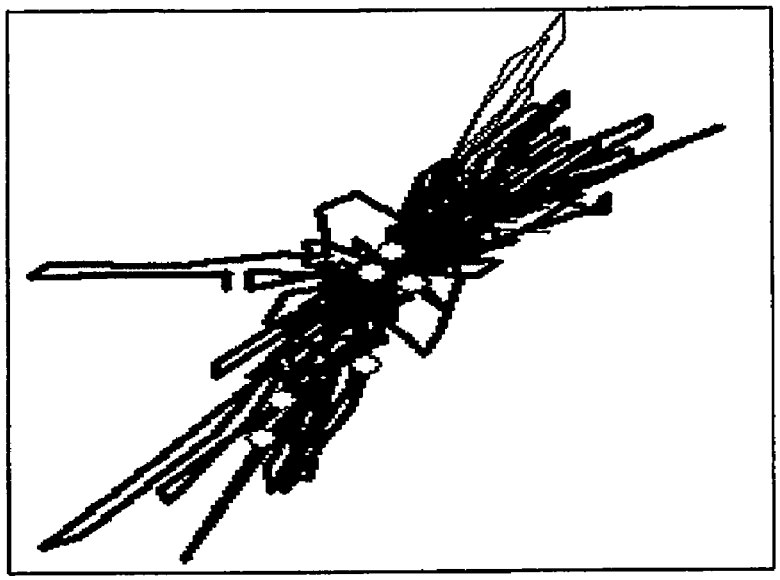
FIGS. 4A and 4B offer examples of velocity-transformed signature patterns in accordance with the present invention.
Figure 4B:
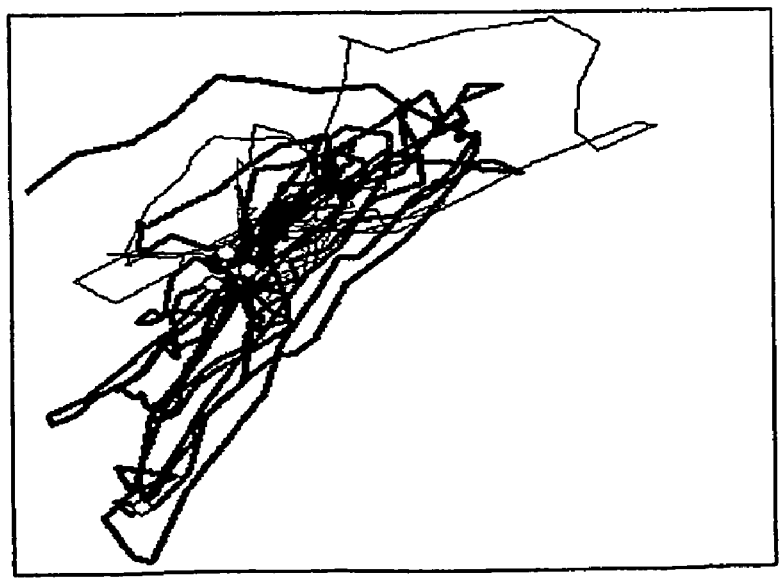

FIGS. 4A and 4B provide transformed results of FIGS. 2A and 3A by a speed transform technique.

While original patterns are quite similar, transformed patterns thereof are considerably different. Therefore, when signature verification is performed in a transformed domain, it is possible to effectively discern a skilled forgery from an original signature.

When transform methods in accordance with the present invention, i.e., a speed equalization and a velocity transform technique, are used, a transformed pattern is represented in the same format as an original pattern. That is to say, every type of signature verification methods that have been developed for online signature verification can be also applied to a transformed pattern. As a result, conventional signature verification methods can consider information on dynamic characteristics, to thereby enable a skilled forgery to be more effectively distinguished from an original signature.

Accordingly, the transform methods of the present invention are not confined to characteristics vector typed signature verification to be described later, but applicable to every online signature verification method for signature patterns.

Referring back to FIG. 1, the feature extraction unit 104 extracts a feature vector representing characteristics of each pattern from an input signature pattern and transformed patterns thereof, wherein the feature vector is a set of parameters indicating characteristics of a signature pattern. In this case, the apparatus for signature verification of the present invention uses parameters shown in following Table 1.

TABLE 1

| | |
|---|---|
| Total Signing Time | total time taken for signing |
| Pen Down Duration | duration of contact between a pen and a tablet |
| Number of PenUps | the number of lifting a pen during a signing process |
| Positive $v_x$ duration | duration of horizontal velocity having a positive value |
| Negative $v_x$ duration | duration of horizontal velocity having a negative value |
| Positive $v_y$ duration | duration of vertical velocity having a positive value |
| Negative $v_y$ duration | duration of vertical velocity having a negative value |
| x velocity | average horizontal velocity |
| y velocity | average vertical velocity |
| Aspect Ratio | a ratio of height to width |
| Upper to Lower Ratio | a ratio of number of sample points above a center of gravity to number of sample points below the center of gravity |
| Left to Right Ratio | a ratio of number of sample points to the left of a center of gravity to number of sample points to the right of center of gravity |
| Center Cross | number of crossing between a signature locus and a horizontal line passing a center of gravity |
| IM1 | Invariant Moment #1 |
| IM2 | Invariant Moment #2 |
| IM3 | Invariant Moment #3 |
| IM4 | Invariant Moment #4 |
| IM5 | Invariant Moment #5 |
| IM6 | Invariant Moment #6 |
| IM7 | Invariant Moment #7 |
| Direction Histogram | histogram of the direction at each point (the number of bins = 8) |
| Radial Histogram | radial distribution histogram of sample points (the number of bins = 16) |

In comparison with a conventional apparatus, the apparatus for signature verification of the present invention has an advantage in that an accuracy of verification can be greatly improved by using a feature vector integrated with three pairs of parameters having different information, wherein the characteristics vector is not only obtained from an input signature pattern but also extracted from a speed equalized pattern and a velocity transformed pattern.

Since most coefficients mentioned in Table 1 are described in other documents, a specific explanation thereof is omitted. Instead, a radial histogram, which is a feature of the present invention, will be described briefly.

Figure 5:
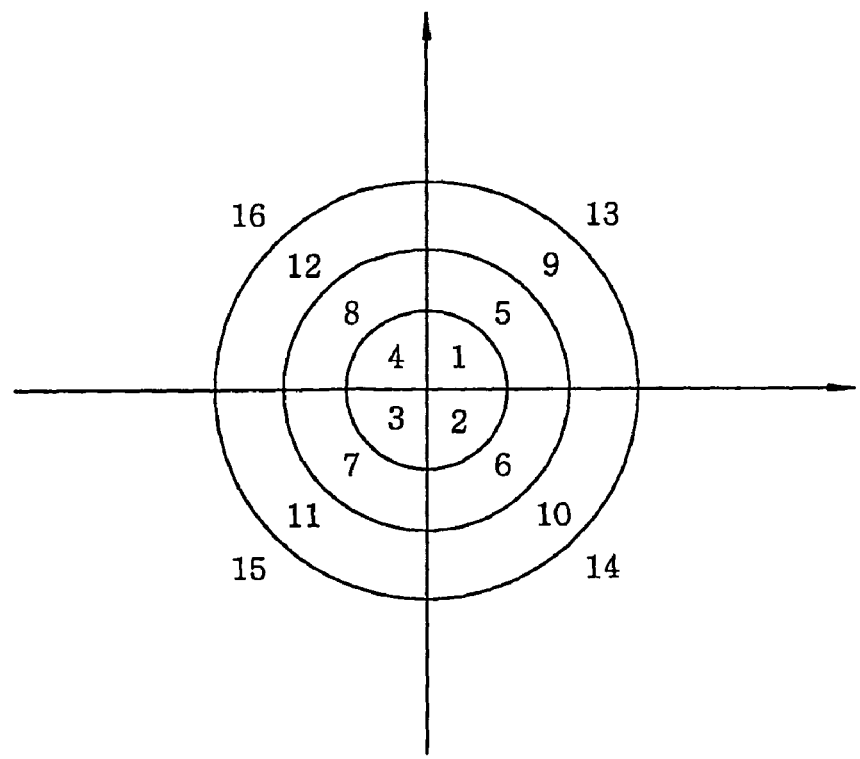
FIG. 5 provides a radial histogram for illustrating radially divided 16 bins.

The radial histogram illustrates a distribution of sample points in radially divided 16 bins as shown in FIG. 5 on a Cartesian coordinate system of which the origin is the center of gravity of a pattern, wherein the distribution is based on locations where a signature locus passes.

The difference vector estimation unit 108 generates a difference vector between a characteristics vector of a reference signature and a characteristics vector extracted from an input signature.

Each element of the difference vector has an absolute value of a difference between each element of the characteristics vectors as shown in Eq. (5) as follows:

$$F_{Di} = |F_{Ti} - F_{Ei}| \qquad \text{Eq. (5)}$$

wherein $F_{Di}$, $F_{Ti}$, and $F_{Ei}$ indicate $I^{th}$ element of the difference vector, the characteristics vector of the input signature and the characteristics vector of the reference signature, respectively.

However, each element of the direction histogram and the radial histogram in the parameter list of Table 1 is interdependent each other, and therefore, a sum of differences instead of each of the differences is inserted in the difference vector as shown in Eq. (6) as follows:

$$D = \sum_{i=1}^{N} |H_r(i) - H_t(i)| \qquad \text{Eq. (6)}$$

wherein the D, N and H(i) represent a difference between the histograms, number of bins and a histogram value of an $I^{th}$ bin, respectively. Further, the subscripts r and t indicate a reference and a test pattern, respectively.

The original characteristics vector has 44 elements as shown in Table 1, but the difference vector has 22 elements, since the direction histogram and the radial histogram are represented by a single value, respectively.

Figure 6:
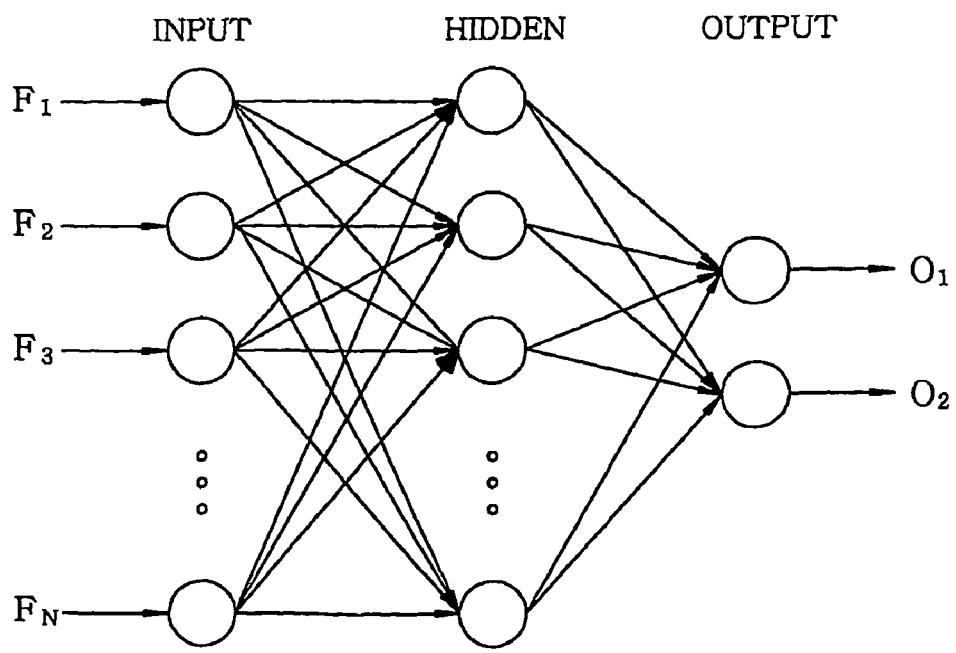
FIG. 6 presents a detailed diagram for showing a determination unit of FIG. 1.

The determination unit 110 determines whether or not an input signature and a reference signature are signed by the same person, based on the difference vector calculated in the difference vector estimation unit 108. Further, the determination unit 110 uses an artificial neural network integrated with three layers, i.e., an input layer, a hidden layer and an output layer having two neurons, as illustrated in FIG. 6 to determine whether or not the input signature and the reference signature are signed by the same person.

In this case, the three pairs of characteristics vectors of Table 1 are respectively extracted from an original pattern and transformed patterns. A vector integrated with the three pairs thereof is inputted into an input parts ($F_1$–$F_N$) of the artificial neural network. The two neurons of the output layer are trained to output 1 and 0 for identical signatures but 0 and 1 for different signatures. Therefore, the determination unit 110 uses the difference between the two values (the difference has a value between −1 and 1 and increases in proportion to the similarity of the signatures) to determine whether the signature is an original or a forgery. To be specific, the signature is determined to have been signed by the same person if the difference is larger than a threshold. On the other hand, the signature is determined to be a skilled forgery if the difference is smaller than the threshold.

As described above, an online signature verification technique using a transform method in accordance with the present invention generates a pattern to which dynamic characteristics of a signing process are reflected through a transform technique, so that an analysis of the dynamic characteristics can be performed effectively. Accordingly, a skilled forgery, which is hardly distinguishable by using only static characteristics, can be accurately distinguished in accordance with the present invention, thereby greatly improving a performance of user verification.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for online signature verification using a reference signature database (DB), the apparatus comprising:
    a signature data input unit for digitalizing a locus of a user's input signature and reading the digitized locus as a signature sequence of sample points sampled at regular time intervals;
    a first pattern transform unit for performing a speed equalization on the signature sequence read by the signature data input unit and generating a first transformed pattern sequence, wherein said speed equalization is based on the assumption that linear velocities at the sample points on the locus are equal to a constant value;
    a second pattern transform unit for performing a velocity transformation on the signature sequence read by the signature data input unit and generating a second transformed pattern sequence;
    a feature extraction unit for extracting a characteristics vector from the signature sequence, the first transformed pattern sequence and the second transformed pattern sequence;
    a difference vector estimation unit for generating a difference vector between a feature vector of the user's reference signature read from the reference signature DB and the characteristics vector extracted by the feature extraction unit; and
    a determination unit for determining whether the input signature and the reference signature are signed by the same person or not, based on the difference vector generated from the difference vector estimation unit.

2. The apparatus of claim 1, wherein the speed equalization is performed by using the following equation:

$$s_i = p_i \; i=1, 2$$

$$s_i = s_{i-1} + (p_i - p_{i-1}) \; i=N-1, N$$

$$s_i = s_{i-1} + v \Delta t \cdot \Theta \text{ otherwise}$$

wherein
   $p_i$ represents the $i^{th}$ sample point on the signature sequence of the digitized locus,
   $s_i$ represents the corresponding $i^{th}$ element of the first transformed pattern sequence,
   v represents the constant velocity,
   $\Delta t$ represents the sampling time interval between the sample points on the signature sequence, and
   $\Theta$ represents a unit vector in the direction $\theta$ of the digitized locus at the sample point $p_i$.

3. The apparatus of claim 1, wherein the velocity transformation is performed by using the following equation:

$$v_i = v_3 \; i=1, 2$$

$$v_i = v_{N-2} \; i=N-1, N$$

$$v_i = (v_{xi}, v_{yi}) \text{ otherwise}$$

wherein
   $v_i$ is the $i^{th}$ element of the second transformed pattern sequence and
   $v_{xi}$ and $v_{yi}$ are first horizontal and vertical derivatives at the corresponding sample point $p_i$ on the digitized locus.

4. The apparatus of claim 1, wherein the speed equalization is a technique for recomposing a signature pattern based on an inverse proportional relation between a signature speed and a length of the pattern, and the velocity transformation is a technique for transforming a spatial pattern into a velocity domain.

5. An online signature verification method using a reference signature DB, the method comprising the steps of:
    (a) digitalizing a locus of a user's input signature and reading the digitized locus as a signature sequence of sample points sampled at regular time intervals;
    (b) performing a speed equalization on the signature sequence read in the step (a) to generate a first transformed pattern sequence, wherein said speed equalization is based on the assumption that linear velocities at the sample points on the locus are equal to a constant value;
    (c) performing a velocity transformation on the signature sequence read in the step (a) to generate a second transformed pattern sequence;
    (d) extracting a characteristics vector from the signature sequence read in the step (a), the first transformed pattern sequence generated in the step (b) and the second transformed pattern sequence generated in the step (c);
    (e) generating, a difference vector between a feature vector of the user's reference signature read from the reference signature DB and the characteristics vector extracted in the step (d); and
    (f) determining whether the input signature and the reference signature are signed by the same person or not, based on the difference vector generated in the step (e).

6. The method of claim 5, wherein the speed equalization is performed by using the following equation:

$$s_i = p_i \; i=1,2$$

$$s_i = s_{i-1} + (p_i - p_{i-1}) \; i=N-1, N$$

$$s_i = s_{i-1} + v \Delta t \cdot \Theta \text{ otherwise}$$

wherein
   $p_i$ represents the $i^{th}$ sample point on the signature sequence of the digitized locus,
   $s_i$ represents the corresponding $i^{th}$ element of the first transformed pattern sequence,
   v represents the constant velocity,
   $\Delta t$ represents the sampling time interval between the sample points on the signature sequence, and
   $\Theta$ represents a unit vector in the direction 0 of the digitized locus at the sample point $p_i$.

7. The method of claim 5, wherein the velocity transformation is performed by using the following equation:

$$v_i = v_3 \; i=1,2$$

$$v_i = v_{N-2} \; i=N-1, N$$

$$v_i = (v_{xi}, v_{yi}) \text{ otherwise}$$

wherein
   $v_i$ is the $i^{th}$ element of the second transformed pattern sequence, and
   $v_{xi}$ and $v_{yi}$ are first horizontal and vertical derivatives at the corresponding sample point $p_i$ on the digitized locus.

8. The method of claim 5, wherein the speed equalization is a technique for recomposing a signature pattern based on an inverse proportional relation between a signature speed and a length of the pattern, and the velocity transformation is a technique for transforming a spatial pattern into a velocity domain.

9. The method of claim 6, wherein the direction θ of the digitized locus at the sample point $p_i$ is determined by the following equation:

$$\theta = \arctan(v_{yi}/v_{xi})$$

wherein
$v_{xi}$ and $v_{yi}$ are first horizontal and vertical derivatives at the sample point $p_i$.

10. The method of claim 9, wherein the velocity transformation is performed by using the following equation:

$$v_i = v_3 \; i=1,2$$

$$v_i = v_{N-2} \; i=N-1, N$$

$$v_i = (v_{xi}, v_{yi}) \text{ otherwise}$$

wherein
$v_i$ is the $i^{th}$ element of the second transformed pattern sequence.

11. The method of claim 10, wherein the first horizontal and vertical derivatives at the sample point p, are determined by the following equations:

$$v_{xi} = (-p_{i+2}(x) + 8 p_{i+1}(x) - 8 p_{i-1}(x) + p_{i-2}(x))/12$$

$$v_{yi} = (-p_{i+2}(y) + 8 p_{i+1}(y) - 8 p_{i-1}(y) + p_{i-2}(y))/12.$$

12. The method of claim 5, wherein the sample points are distributed according to a radial histogram which comprises bins successively arranged around the origin of a Cartesian coordinate system, and wherein the distribution is based on locations where the locus passes.

13. The apparatus of claim 2, wherein the direction θ of the digitized locus at the sample point $p_i$ is determined by the following equation:

$$\theta = \arctan(v_{yi}/v_{xi})$$

wherein
$v_{xi}$ and $v_{yi}$ are first horizontal and vertical derivatives at the sample point $p_i$.

14. The apparatus of claim 13, wherein the velocity transformation is performed by using the following equation:

$$v_i = v_3 \; i=1,2$$

$$v_i = v_{N-2} \; i=N-1, N$$

$$v_i = (v_{xi}, v_{yi}) \text{ otherwise}$$

wherein
$v_i$ is the $i^{th}$ element of the second transformed pattern sequence.

15. The apparatus of claim 14, wherein the first horizontal and vertical derivatives at the sample point $p_i$ are determined by the following equations:

$$v_{xi} = (-p_{i+2}(x) + 8 p_{i+1}(x) - 8 p_{i-1}(x) + p_{i-2}(x))/12$$

$$v_{yi} = (-p_{i+2}(y) + 8 p_{i+1}(y) - 8 p_{i-1}(y) + p_{i-2}(y))/12.$$

16. The apparatus of claim 1, wherein the sample points are distributed according to a radial histogram which comprises bins successively arranged around the origin of a Cartesian coordinate system, and wherein the distribution is based on locations where the locus passes.

* * * * *